(12) United States Patent
Miyamoto et al.

(10) Patent No.: US 8,534,169 B2
(45) Date of Patent: Sep. 17, 2013

(54) MACHINING METHOD AND MACHINING SYSTEM

(75) Inventors: Satoshi Miyamoto, Yamatokoriyama (JP); Ryuichi Fujiwara, Yamatokoriyama (JP); Shizuo Nishikawa, Yamatokoriyama (JP); Hisayoshi Morita, Yamatokoriyama (JP)

(73) Assignee: Mori Seiki Co., Ltd., Nara (JP)

( * ) Notice: Subject to any disclaimer, the term of this patent is extended or adjusted under 35 U.S.C. 154(b) by 672 days.

(21) Appl. No.: 12/777,267

(22) Filed: May 11, 2010

(65) Prior Publication Data

US 2010/0288089 A1 Nov. 18, 2010

(30) Foreign Application Priority Data

May 15, 2009 (JP) ................................. 2009-118458

(51) Int. Cl.
*B23B 3/06* (2006.01)
*G05B 19/401* (2006.01)

(52) U.S. Cl.
USPC ............................. 82/1.11; 700/195; 82/118

(58) Field of Classification Search
USPC ........... 82/118, 1.11, 133; 29/27 R; 700/195
See application file for complete search history.

(56) References Cited

U.S. PATENT DOCUMENTS

| | | | | |
|---|---|---|---|---|
| 3,749,500 A | * | 7/1973 | Carlson et al. | 356/638 |
| 4,031,368 A | * | 6/1977 | Colding et al. | 700/173 |
| 4,576,482 A | * | 3/1986 | Pryor | 356/612 |
| 5,841,542 A | * | 11/1998 | Milana et al. | 356/635 |
| 6,781,703 B1 | * | 8/2004 | Southwood | 356/602 |
| 8,051,754 B2 | * | 11/2011 | Kase et al. | 82/118 |

FOREIGN PATENT DOCUMENTS

| | | |
|---|---|---|
| DE | 19958616 A1 | 6/2001 |
| EP | 1321226 A2 | 6/2003 |
| JP | 61131854 A * | 6/1986 |
| JP | 07136801 | 5/1995 |
| JP | 2002-059301 | 2/2002 |
| JP | 2004-261935 | 9/2004 |

OTHER PUBLICATIONS

European Search Report dated Aug. 25, 2010 for 10162115.9, which is a European counterpart application, that cites DE19958616A1, EP1321226A2, and JP7136801A.

\* cited by examiner

*Primary Examiner* — Will Fridie, Jr.
(74) *Attorney, Agent, or Firm* — WPAT, P.C.; Anthony King

(57) ABSTRACT

The present invention relates to a machining system etc. capable of highly accurately machining a workpiece even in a case where the workpiece is deflected. A machining system 1 is configured with a lathe 10 having end portion supporting mechanisms 13, 15 for supporting both end portions of an elongated workpiece W horizontally, a tool rest 20 for holding a tool, a feed mechanism for moving the tool rest 20 in three orthogonal directions, and a control device 25 for controlling the feed mechanism, and a non-contact measuring device 30 for measuring the deflection shape of the workpiece W when the workpiece W is rotated. The control device 25 moves the tool along the deflection shape measured by the non-contact measuring device 30.

9 Claims, 6 Drawing Sheets

MACHINING METHOD AND MACHINING SYSTEM

TECHNICAL FIELD

The present invention relates to a machining method and machining system in which both end portions of an elongated workpiece are supported horizontally by end portion supporting means and the supported workpiece is rotated about its axis and is machined by a tool held by tool holding means.

BACKGROUND ART

In a machining device such as a lathe, when machining a workpiece, for example as described in Japanese Unexamined Patent Application Publication No. 2002-59301, the workpiece is machined in a state where both end portions thereof are supported.

However, in the above supporting way, in a case where a workpiece W is an elongated workpiece, the workpiece W is deflected by its own weight as shown in FIG. 8, and thereby it is not possible to highly accurately machine the workpiece W. It is noted that in FIG. 8, reference numerals 100 refer to chucks for supporting both end portions of the workpiece W.

Therefore, for example, as described in Japanese Unexamined Patent Application Publication No. 2004-261935, the middle portion of the workpiece, as well as both end portions thereof, is supported by a center rest or the like and the workpiece is machined while preventing the middle portion from being deflected.

SUMMARY OF INVENTION

Technical Problem

However, even in a case where the middle portion of the workpiece W is supported, as shown in FIG. 9, it is not possible to prevent the deflection of the workpiece W by its own weight from occurring between the chucks 100 supporting end portions of the workpiece W and center rests 101 or between the center rests 101. Therefore, it is not possible to highly accurately machine the workpiece W because of the deflection occurring at these portions.

The present invention has been achieved in view of the above-described circumstances, and an object of the present invention is to provide a machining method and machining system capable of highly accurately machining a workpiece even in a case where the workpiece is deflected.

Solution to Problem

The present invention, for achieving the above-described object, relates to a machining method in which both end portions of an elongated workpiece are supported horizontally by end portion supporting means and the supported workpiece is rotated about its axis and the outer peripheral surface of the workpiece is machined by relative movement of the workpiece and a tool held by tool holding means, the machining method characterized in that:

first, the workpiece is supported by the end portion supporting means and a measuring head for measuring the distance between the measuring head and the outer peripheral surface of the workpiece without contact is attached to the tool holding means;

subsequently, the workpiece is rotated about its axis at a rotational speed for when the workpiece is machined, and the distance between the measuring head and the outer peripheral surface of the workpiece is measured by the measuring head at a plurality of positions in the direction of the workpiece axis and the deflection shape of the workpiece is calculated; and then the outer peripheral surface of the workpiece is machined by moving the tool along the calculated deflection shape.

This machining method can be preferably performed by a machining system described below. That is, the machining system comprises a machining device for machining the outer peripheral surface of an elongated workpiece supported horizontally and a non-contact measuring device for measuring the deflection of a workpiece to be machined by the machining device, and the machining system is configured so that:

the machining device has end portion supporting means for supporting both end portions of the workpiece horizontally, rotation drive means for rotating the workpiece supported by the end portion supporting means about its axis, tool holding means which is provided so as to be movable in three orthogonal directions, a Z-axis parallel to the axis of the workpiece, an X-axis orthogonal to the Z-axis, a Y-axis orthogonal to both of the Z-axis and X-axis, and holds a tool, feed means for moving the tool holding means, and control means for controlling the rotation drive means and the feed means;

the non-contact measuring device has a measuring head which is configured so as to be attachable to and detachable from the tool holding means and measures, at a plurality of measurement positions set in the Z-axis direction, without contact, the distance between the measuring head and the outer peripheral surface of the workpiece being supported by the end portion supporting means and being rotated by the rotation drive means at a rotational speed for when the workpiece is machined, and deflection shape calculating means for calculating the deflection shape of the workpiece on the basis of the distances measured by the measuring head at the measurement positions and the positions of the tool holding means when the distances were measured which are obtained from the control means; and the control means moves the tool along the deflection shape calculated by the deflection shape calculating means.

According to this machining system, in machining a workpiece supported by the end portion supporting means, first the deflection shape of the workpiece supported by the end portion supporting means is calculated. This deflection shape is the deflection shape of the workpiece being rotated.

The reason for calculating the deflection shape of the workpiece being rotated is that, as a result of repeated research by the inventors of the present invention and others, it has turned out that there is a difference in the deflection state of the workpiece between when the workpiece is being rotated and when the workpiece is not being rotated. Therefore, in a case where the deflection of a workpiece is measured when the workpiece is not being rotated, the deflection measured at this time is different from the deflection measured when the workpiece is being rotated for machining. Hence, in the present invention, the deflection shape of the workpiece is calculated in the following manner.

That is, first the workpiece supported by the end portion supporting means is rotated about its axis by the rotation drive means at the same rotational speed as that for when the workpiece is machined, and the distance between the outer peripheral surface of the workpiece being rotated and the measuring head is measured by the measuring head without contact at a plurality of measurement positions in the Z-axis direction. Thereafter, the deflection shape of the workpiece is calculated on the basis of the distances measured at the measurement positions and the positions of the tool holding means when the distances were thus measured which are obtained from the control means.

Once the deflection shape of the workpiece is calculated in this way, a predetermined tool is held by the tool holding means and the tool and the workpiece are moved relatively, and thereby the outer peripheral surface of the workpiece is machined. At this time, the tool is moved by the control means along the deflection shape calculated by the deflection shape calculating means.

Thus, according to the machining method and machining system of the present invention, since the deflection shape of the workpiece is calculated in a state where the workpiece is rotated at a rotational speed for when the workpiece is machined, it is possible to accurately calculate the deflection occurring when the workpiece is machined. Further, since the tool is moved along the thus calculated deflection shape, it is possible to accurately machine the workpiece even in a case where the workpiece is deflected and even in a case where there is a difference in the deflection state of the workpiece between when the workpiece is being rotated and when the workpiece is not being rotated.

Further, since a non-contact type measuring head is employed, it is possible to perform the measurement with the workpiece being rotated, which cannot be performed by a contact-type measuring device using a touch probe or the like.

The measuring head may be configured with light emitting means for emitting a laser beam toward the outer peripheral surface of the workpiece, light receiving means for receiving the laser beam reflected by the outer peripheral surface of the workpiece, and distance calculating means for calculating the distance between the measuring head and the outer peripheral surface of the workpiece on the basis of received-light data of the light receiving means.

Further, the light emitting means may be configured to emit a laser beam in the Y-axis direction. In this case, the measuring head is configured to, at each measurement position, be moved in the X-axis direction by the tool holding means moving in the X-axis direction and measure said distance at a plurality of positions in its moving direction, and the deflection shape calculating means is configured to calculate the center position of the workpiece at each measurement position on the basis of the distances measured by the measuring head and the positions of the tool holding means when the distances were measured which are obtained from the control means, and then calculate the deflection shape of the workpiece. In this case, the deflection shape of the workpiece can be calculated from the center positions of the workpiece. In calculating the center position of the workpiece, it can be calculated from the positions of a plurality of measurement points on the outer peripheral surface of the workpiece or from the positions of a plurality of measurement points on the outer peripheral surface of the workpiece and the diameter of the workpiece which is known in advance.

The light emitting means may be configured to emit a laser beam in the vertical direction. In this case, the measuring head is configured to measure the distance between the upper outer peripheral surface of the workpiece and the measuring head at each measurement position.

Furthermore, in the machining device, one or more middle portion supporting means may be provided for supporting the middle portion of the workpiece supported by the end portion supporting means. The middle position of the workpiece refers to not only the center in the direction of the workpiece axis but the portion between one end portion and the other end portion of the workpiece.

Advantageous Effects of Invention

As described above, according to the machining method and machining system of the present invention, since the deflection of a workpiece occurring when the workpiece is machined is calculated and the tool is moved along the calculated deflection, it is possible to accurately machine the workpiece.

DESCRIPTION OF EMBODIMENTS

Figure 1:
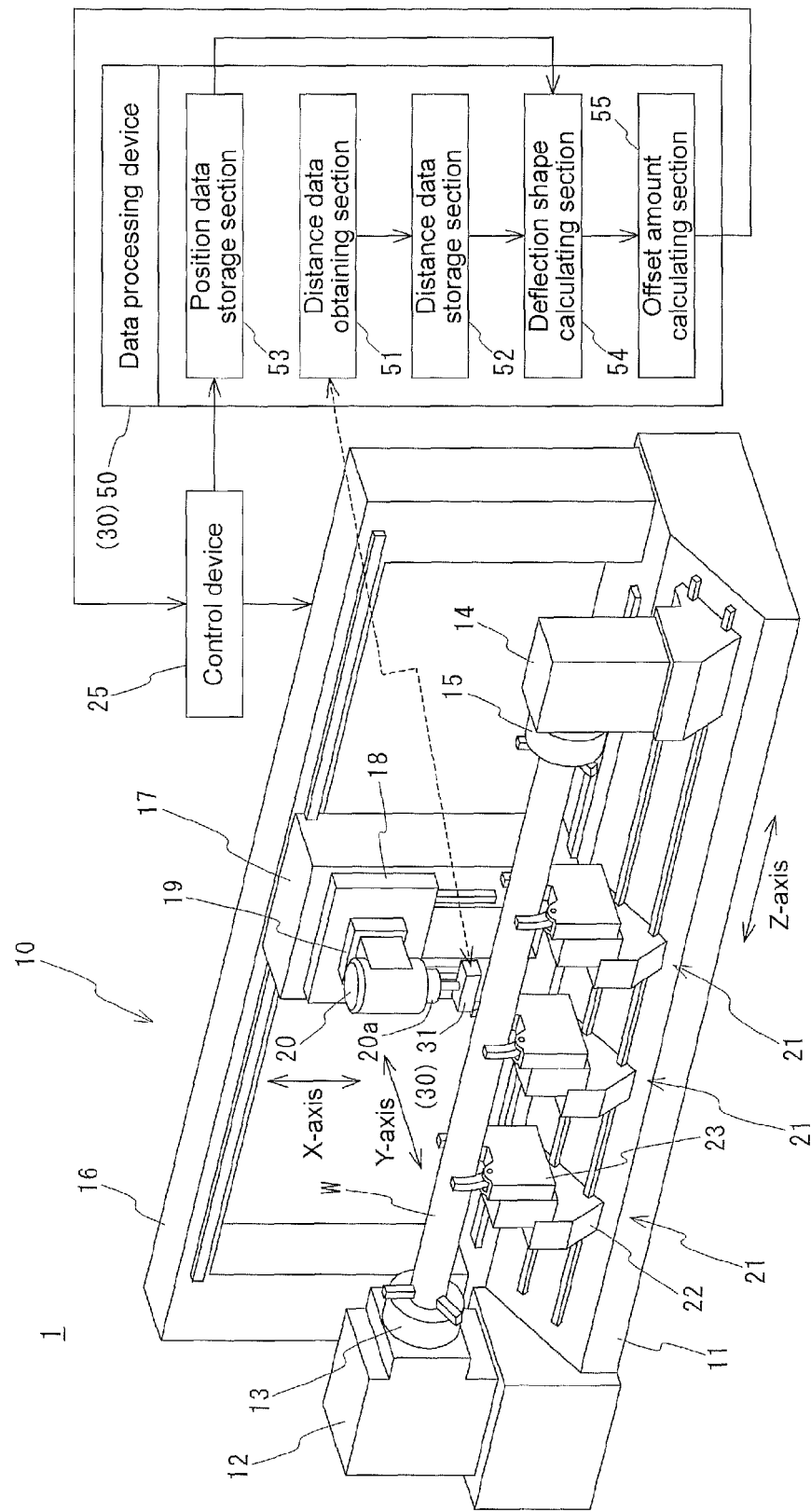
FIG. 1 is a perspective view showing a schematic configuration of a machining system according to one embodiment of the present invention, which is partially represented by block diagram.
Figure 2:
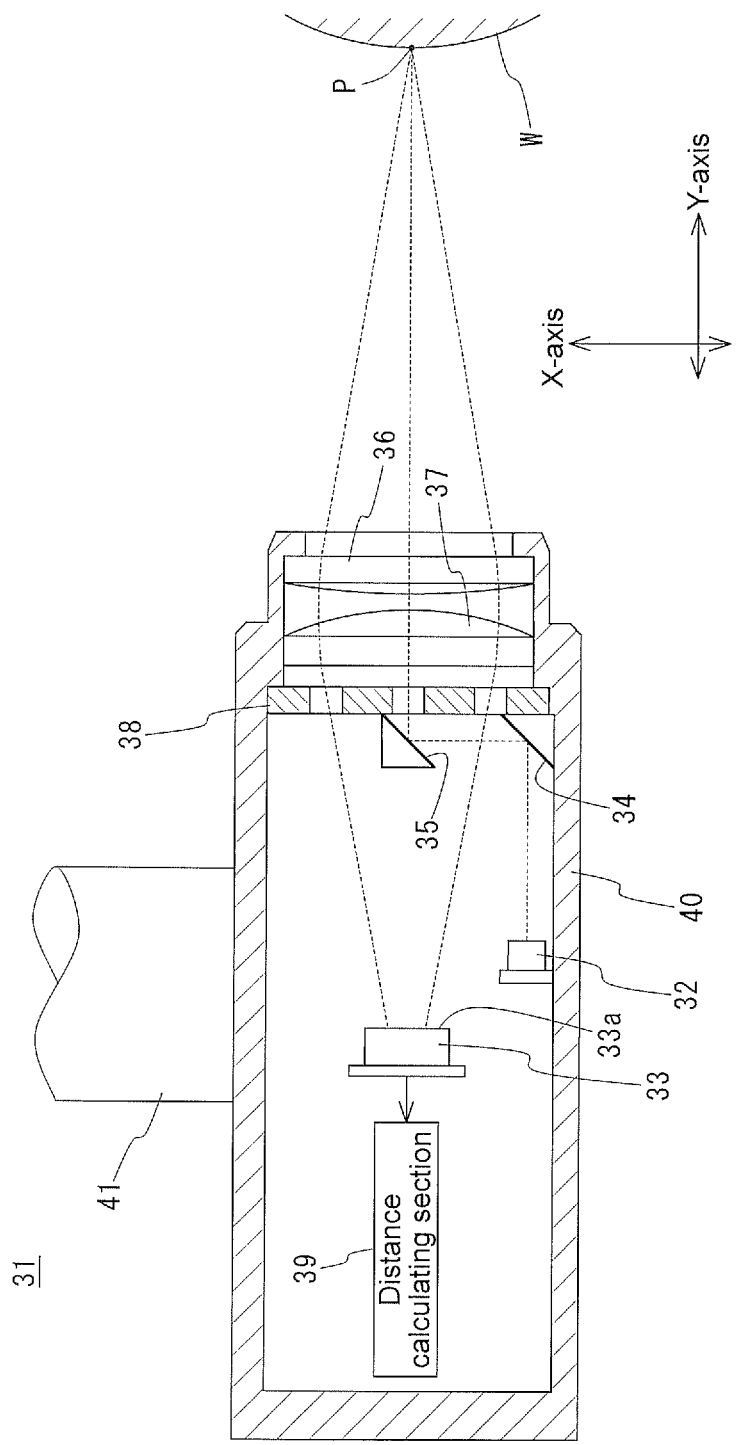
FIG. 2 is a sectional view showing a schematic configuration of a measuring head according to the embodiment.

Hereinafter, a specific embodiment of the present invention will be explained with reference to the accompanying drawings. FIG. 1 is a perspective view showing a schematic configuration of a machining system according to one embodiment of the present invention, which is partially represented by block diagram, and FIG. 2 is a sectional view showing a schematic configuration of a measuring head according to the embodiment.

As shown in FIG. 1, a machining system 1 of the present embodiment is configured with a lathe 10 as a machining device and a laser-type measuring device 30 for measuring the deflection of a workpiece W to be machined by the lathe 10, and the lathe 10 is configured to move a tool along the deflection of the workpiece W measured by the laser-type measuring device 30.

The lathe 10 is configured with a bed 11, a first headstock 12 fixedly provided on the bed 11, a first spindle (not shown) supported by the first headstock 12 so as to be rotatable about its horizontal axis, a first chuck 13 mounted to the tip of the first spindle for holding one end portion of the workpiece W horizontally, a second headstock 14 disposed on the bed 11 so as to face the first headstock 12 and so as to be movable in a Z-axis direction that is the direction of the axis of the first spindle (not shown), a second spindle (not shown) supported by the second headstock 14 so as to be co-axial with the axis of the first spindle and so as to be rotatable about its axis, a second chuck 15 mounted to the tip of the second spindle for holding the other end portion of the workpiece W horizontally, a column 16 fixedly provided on the bed 11, a first saddle 17 supported at the upper portion thereof by the column 16 and at the lower portion thereof by the bed 11 and provided so as to be movable in the Z-axis direction, a second saddle 18 disposed on the first saddle 17 so as to be movable in an X-axis direction that is the vertical direction, a quill 19 disposed on the second saddle 18 so as to be movable in a Y-axis direction that is orthogonal to both of the Z-axis and X-axis, a tool rest 20 supported on the front end face of the quill 19, a plurality of center rests 21 which are disposed on the bed 11 between the first headstock 12 and the second headstock 14 so as to be movable in the Z-axis direction and the X-axis direction and support the middle portion of the workpiece W, and other components.

In addition, although not particularly shown, the lathe 10 is provided with a rotation drive mechanism for rotating the first spindle about its axis, a first Z-axis feed mechanism for moving the second headstock 14 in the Z-axis direction, a second Z-axis feed mechanism for moving the first saddle 17 in the Z-axis direction, a first X-axis feed mechanism for moving the second saddle 18 in the X-axis direction, a Y-axis feed mechanism for moving the quill 19 in the Y-axis direction, and a third Z-axis feed mechanism and second X-axis feed mechanism provided corresponding to each center rest 21 for moving the center rest 21 in the Z-axis direction and in the X-axis direction, respectively, as well as a control device 25 for controlling their operations. Each of the feed mechanisms is configured with a drive motor, a ball screw, a nut and other components.

The tool rest 20 has a tool spindle 20a supported so as to be rotatable about its axis and a drive motor (not shown) for rotating the tool spindle 20a about its axis, and a tool (not shown) is held by the tool spindle 20a.

Each of the center rests 21 is configured with a sliding carriage 22 disposed on the bed 11 so as to be movable in the Z-axis direction and a center rest body 23 which is disposed on the sliding carriage 22 so as to be movable in the X-axis direction and which supports the workpiece W. The sliding carriage 22 is driven by the third Z-axis feed mechanism and the center rest body 23 is driven by the second X-axis feed mechanism. Each of the center rests 21 supports the middle portion of the workpiece W so that the height positions of the both end portions of the workpiece W and the height position of the portion thereof supported by the center rest body 23 become the same.

The control device 25 moves the tool rest 20 by controlling the feed mechanisms, and thereby the tool held by the tool rest 20 is moved in the direction of the axis of the workpiece W supported by the chucks 13, 15 and the center rests 21 and the outer peripheral surface of the workpiece W is machined. At this time, the tool is moved along the deflection shape calculated by a later-described deflection shape calculating section 54 on the basis of the offset amount calculated by a later-described offset amount calculating section 55. For example, a tool moving path set in advance is offset according to the offset amount and the offset tool moving path is set as a path along the deflection shape, or moving positions of the tool set in advance are offset according to the offset amount and the offset moving positions are set as moving positions along the deflection shape.

The laser-type measuring device 30 is configured with a measuring head 31 for measuring the distance between the measuring head 31 and the outer peripheral surface of the workpiece W being rotated at the same rotational speed as that for when the workpiece W is machined and a data processing device 50 for calculating the deflection shape of the workpiece W on the basis of data (distance data) on the distance measured by the measuring head 31 etc.

The reason for calculating the deflection shape of the workpiece W being rotated is that, as a result of repeated research by the inventors of the present invention and others, it has turned out that there is a difference in the deflection state of the workpiece W between when the workpiece W is being rotated and when the workpiece W is not being rotated. Therefore, in a case where the deflection of the workpiece W is measured when the workpiece W is not being rotated, the deflection measured at this time is different from the deflection of the workpiece W measured when the workpiece W is being rotated for machining. For this reason, in the present embodiment, the deflection shape of the workpiece W being rotated is calculated.

The measuring head 31 includes a laser oscillator 32 for emitting a laser beam in the Y-axis direction toward the outer peripheral surface of the workpiece W, a CCD camera 33 for receiving the laser beam reflected by the outer peripheral surface of the workpiece W and generating two-dimensional image data, a prism 34 and reflecting mirror 35 for directing the laser beam from the laser oscillator 32 to the outer peripheral surface of the workpiece W, two convex lenses 36, 37 for forming an image of the laser beam reflected by the outer peripheral surface of the workpiece W on an image plane 33a of the CCD camera 33 (specifically, concentrating the laser beam as an annular image), a diaphragm 38 arranged between the CCD camera 33 and the convex lens 37, a distance calculating section 39 for calculating the distance in the Y-axis direction between the measuring head 31 and the outer peripheral surface of the workpiece W (the distance between the image plane 33a of the CCD camera 33 and an irradiation point P of the laser beam) on the basis of the two-dimensional image data generated by the CCD camera 33, a transmitting device (not shown) for transmitting the distance data calculated by the distance calculating section 39 to the data processing device 50 by a wireless communication, a casing 40 for holding the laser oscillator 32, the CCD camera 33, the prism 34, the reflecting mirror 35, the convex lenses 36, 37, the diaphragm 38, the distance calculating section 39, the transmitting device etc. therein, and a mounting member 41 fixedly provided on the upper face of the casing 40 and being attachable to and detachable from the tool spindle 20a.

The distance calculating section 39 extracts the annular image of the reflected laser beam on the basis of the two-dimensional image data generated by the CCD camera 33, recognizes the diameter of the annular image, and calculates the distance between the image plane 33a and the irradiation point P from the recognized diameter.

Figure 3:
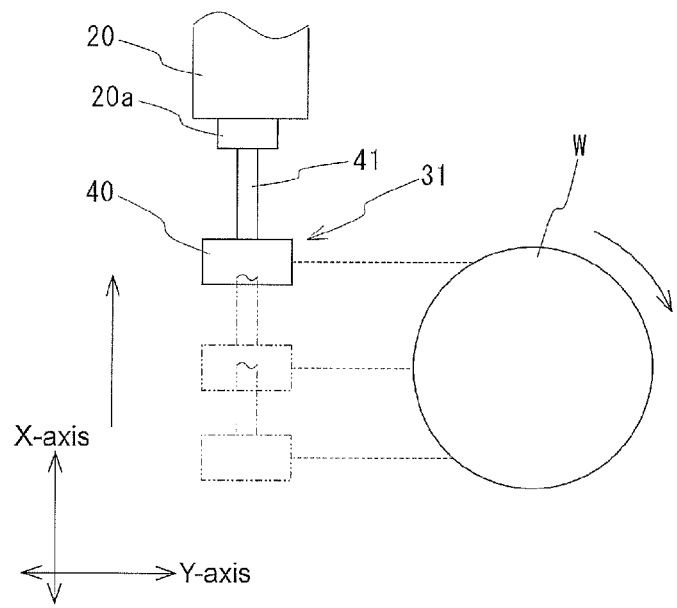
FIG. 3 is an illustration for illustrating measurement of the distance between the measuring head and the outer peripheral surface of a workpiece in the embodiment.
Figure 4:
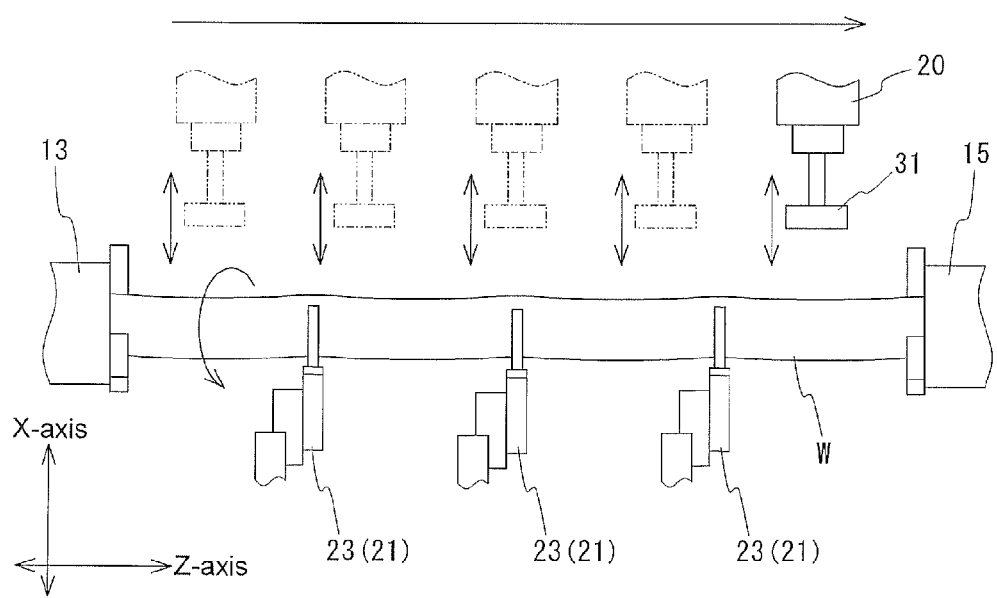
FIG. 4 is an illustration for illustrating the measurement of the distance between the measuring head and the outer peripheral surface of the workpiece in the embodiment.

The measuring head 31 is, in a state of being attached to the tool spindle 20a, moved in the X-axis direction by the movement of the tool rest 20 in the X-axis direction as shown in FIG. 3, for example. And the measuring head 31 measures said distance at a plurality of positions in its moving direction. Such measurement is performed at each of a plurality of measurement positions which are set in the direction of the axis of the workpiece W as shown in FIG. 4.

The data processing section 50 includes a distance data obtaining section 51 for obtaining the distance data by receiving the distance data transmitted from the measuring head 31 by a wireless communication, a distance data storage section 52 for storing the distance data obtained by the distance data obtaining section 51, a position data storage section 53 for storing moving position data on a moving position in the X-axis, Y-axis and Z-axis directions of the tool rest 20 which is obtained from the control device 25, a deflection shape calculating section 54 for calculating the deflection shape of the workpiece W on the basis of the data stored in the distance data storage section 52 and in the position data storage section 53, and an offset amount calculating section 55 for calculating the offset amount on the basis of the deflection shape calculated by the deflection shape calculating section 54.

In the position data storage section 53, moving position data on the moving position of the tool rest 20 when the distance between the outer peripheral surface of the workpiece W and the CCD camera 33 is measured (for example, when a laser beam is emitted from the laser oscillator 32, when a shutter of the CCD camera 33 is released etc.) is stored.

The deflection shape calculating section 54 first calculates the position in the X-axis, Y-axis and Z-axis directions of each irradiation point P on the basis of a group of data which is the data stored in the distance data storage section 52 and in the position data storage section 53 and which is obtained through the movement of the measuring head 31 in the X-axis direction, and then calculates the center position of the workpiece W on the basis of the calculated positions of the irradiation points P. The calculation of the center position of the workpiece W is performed with respect to each measurement position. In calculating the center position of the workpiece W, it may be calculated on the basis of only the positions of the irradiation points P or on the basis of the positions of the irradiation points P and the diameter of the workpiece W which is known in advance.

Here, an example of a manner of calculating the center position of the workpiece W from the calculated positions of a plurality of irradiation points P (n irradiation points P) will be briefly explained. First of all, the equation for a sphere of radius r centered at α, β, γ is given as Equation 1, and then α, β, γ, r are defined as Equation 2. At this time, Equation 1 can be represented as Equation 3.

$$(X - \alpha)^2 + (Y - \beta)^2 + (Z - \gamma)^2 = r^2 \quad \text{Equation 1}$$

$$\alpha = -(a/2),\ \beta = -(b/2),\ \gamma = -(c/2), \quad \text{Equation 2}$$

$$r = \sqrt{\frac{a^2 + b^2 + c^2}{4} - d}$$

$$X^2 + Y^2 + Z^2 + aX + bY + cZ + d = 0 \quad \text{Equation 3}$$

When the equation in Equation 3 is partially differentiated with respect to each of a, b, c, d, Equation 4 can be obtained and Equation 5 can be obtained from Equation 4. Values of a, b, c, d are calculated from Equation 5, and when the values are substituted for Equation 2, the center position α, β, γ and the radius r are obtained. The center position of the workpiece W can be calculated in this way.

$$\sum (X^2 + Y^2 + Z^2 + aX + bY + cZ + d) \times X = 0 \quad \text{Equation 4}$$
$$\sum (X^2 + Y^2 + Z^2 + aX + bY + cZ + d) \times Y = 0$$
$$\sum (X^2 + Y^2 + Z^2 + aX + bY + cZ + d) \times Z = 0$$
$$\sum (X^2 + Y^2 + Z^2 + aX + bY + cZ + d) \times 1 = 0$$

$$\begin{pmatrix} \sum X^2 & \sum XY & \sum ZX & \sum X \\ \sum XY & \sum Y^2 & \sum ZY & \sum Y \\ \sum ZX & \sum YZ & \sum Z^2 & \sum Z \\ \sum X & \sum Y & \sum Z & n \end{pmatrix} \begin{pmatrix} a \\ b \\ c \\ d \end{pmatrix} = \quad \text{Equation 5}$$

$$\begin{pmatrix} -\sum (X^2 + Y^2 + Z^2)X \\ -\sum (X^2 + Y^2 + Z^2)Y \\ -\sum (X^2 + Y^2 + Z^2)Z \\ -\sum (X^2 + Y^2 + Z^2) \end{pmatrix}$$

On the basis of the calculated center positions of the workpiece W at the measurement positions, the deflection shape of the workpiece W is calculated. This deflection shape can be obtained by, for example, calculating the deflection curve.

Figure 5:
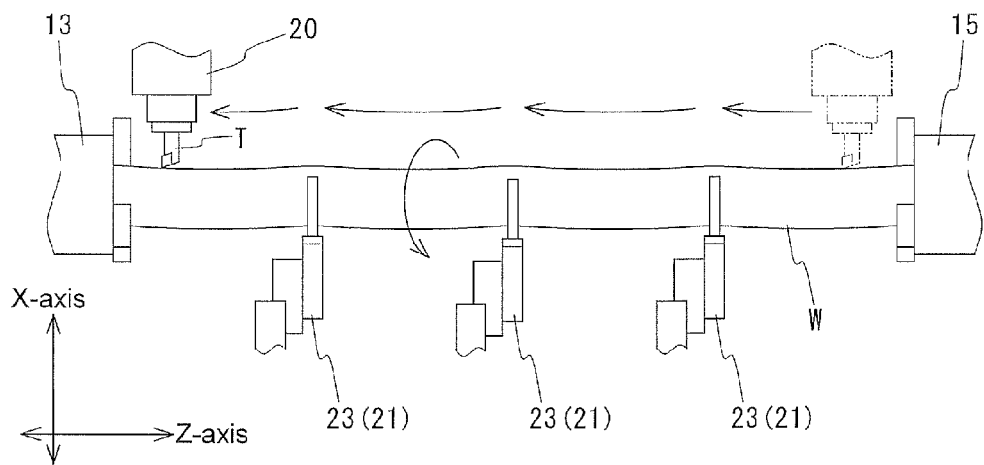
FIG. 5 is an illustration for illustrating movement of a tool at the time of machining in the embodiment.

The offset amount calculating section 55 calculates the offset amount for moving a tool T held by the tool rest 20 along the deflection shape calculated by the deflection shape calculating section 54 as shown in FIG. 5. For example, offset amount for changing a preset tool moving path to be a path along the deflection shape is calculated, or the offset amount of preset moving positions of the tool T for moving the tool T along the deflection shape is calculated. The offset amount may be calculated before moving the tool T, or alternatively the tool T may be moved while the offset amount is being calculated. Further, the offset amount may be calculated according to a predetermined calculation equation or by referring to a data table.

According to the machining system 1 of the present embodiment configured as described above, a workpiece W is machined in a manner described below. That is, first both end portions of the workpiece W are gripped by the chucks 13, 15, respectively and the middle portion of the workpiece W is supported by the center rests 21, and the measuring head 31 is attached to the tool spindle 20*a* of the tool rest 20.

Subsequently, the workpiece W is rotated about its axis at the same rotational speed as that for when the workpiece W is machined. Thereafter, the measuring head 31 is moved to the measurement positions in turn, and at each measurement position the measuring head 31 is moved in the X-axis direction and the laser beam is scanned in the same direction. At a plurality of positions in the X-axis direction, the distance between the outer peripheral surface of the workpiece W and the measuring head 31 is measured.

On the basis of the thus measured distances and the moving positions of the tool rest 20 when the distances were measured, the deflection shape calculating section 54 calculates the position in the X-axis, Y-axis and Z-axis directions of each irradiation point P of the laser beam, calculates the center position of the workpiece W therefrom, and then calculates the deflection shape of the workpiece W.

Thereafter, the measuring head 31 is detached from the tool spindle 20*a* of the tool rest 20, and then a predetermined tool is attached thereto and the workpiece W being rotated is machined by the tool. At this time, the tool is moved along the deflection shape calculated by the deflection shape calculating section 54 according to the offset amount which is calculated by the offset amount calculating section 55 on the basis of this deflection shape.

Thus, according to the machining system 1 of the present embodiment, since the deflection shape of the workpiece W is calculated in a state where the workpiece W is being rotated at a rotational speed for when the workpiece W is machined, it is possible to accurately calculate the deflection occurring when the workpiece W is machined. Further, since the tool is moved along the thus calculated deflection shape, it is possible to highly accurately machine the workpiece W even in a case the workpiece W is deflected and even in a case where there is a difference in the deflection state of the workpiece W between when the workpiece W is being rotated and when the workpiece W is not being rotated, Further, since a non-contact type measuring head 31 is employed, it is possible to perform the measurement with the workpiece W being rotated, which cannot be performed by a contact-type measuring device using a touch probe or the like.

Thus, one embodiment of the present invention has been explained. However, a specific mode in which the present invention can be realized is not limited thereto.

Figure 6:
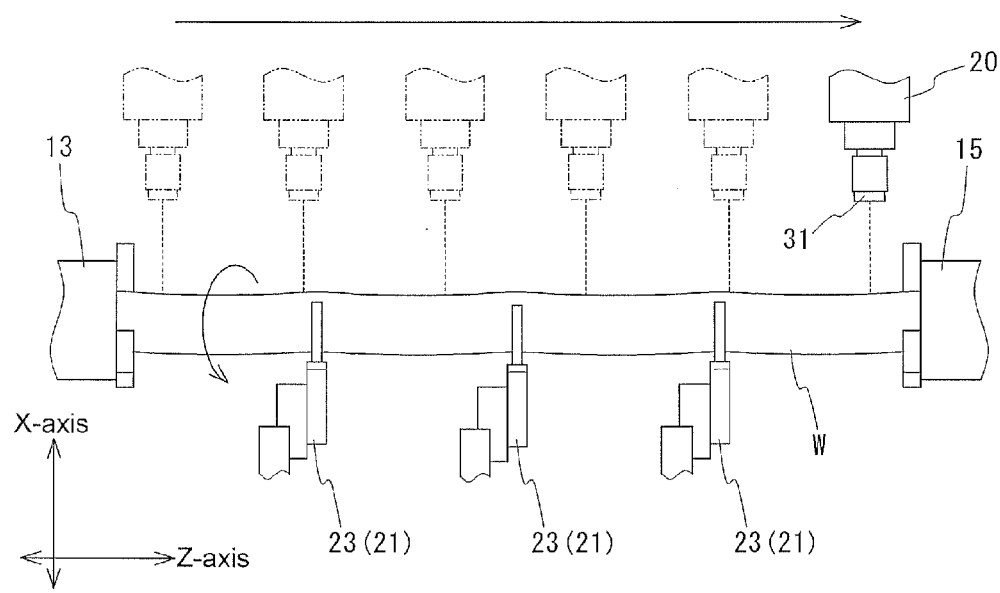
FIG. 6 is an illustration for illustrating measurement of the distance between the measuring head and the outer peripheral surface of the workpiece in an alternative embodiment of the present invention.

For example, although, in the above embodiment, the measuring head 31 is moved to the measurement positions in turn and at each measurement point the laser beam is scanned in the X-axis direction, it is not limited thereto. As shown in FIG. 6, it is may be configured so that the measuring head 31 emits a laser beam in the X-axis direction toward the upper outer peripheral surface of the workpiece W and the laser beam is scanned in the direction of the axis of the workpiece W (in the Z-axis direction).

In this case, the measuring head 31 emits a laser beam at positions at regular intervals toward the upper outer peripheral surface of the workpiece W while moving in the direction of the axis of the workpiece W, and measures, at a plurality of positions in the direction of the axis of the workpiece W, the distance between the measuring head 31 and the irradiation point P on the upper outer peripheral surface of the workpiece W. Further, the deflection shape calculating section 54 calculates the position in the X-axis, Y-axis and Z-axis directions of each irradiation point P on the basis of the data stored in the distance data storage section 52 and in the position data storage section 53, and calculates the deflection shape of the entire workpiece W (the deflection shape of the upper outer peripheral surface of the workpiece W) on the basis of the calculated positions of the irradiation points P.

Figure 7:
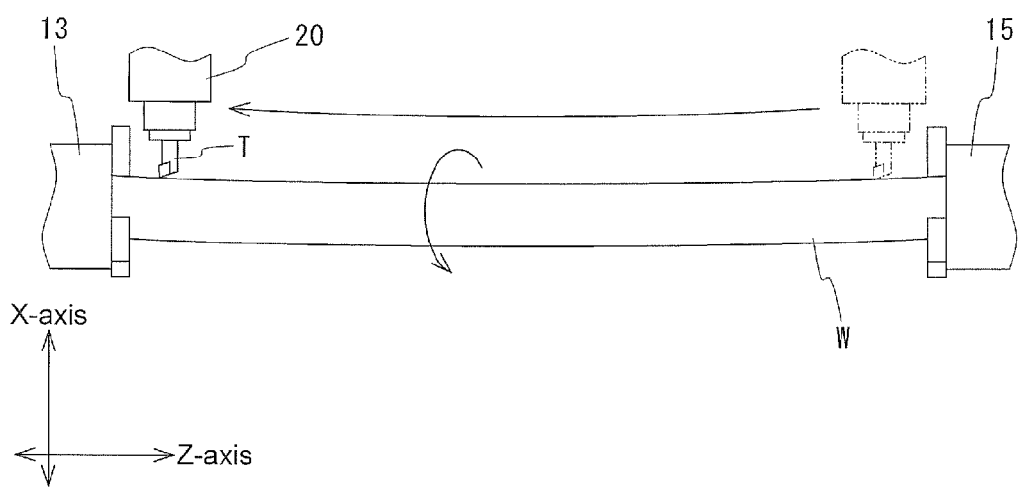
FIG. 7 is an illustration for illustrating movement of the tool at the time of machining in an alternative embodiment of the present invention.
Figure 8:
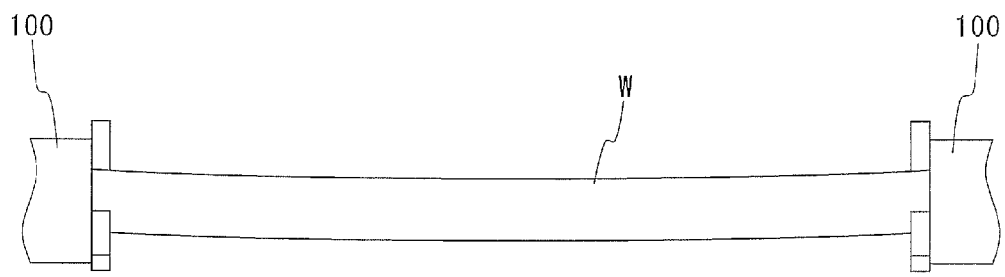
FIG. 8 is an illustration for illustrating a conventional problem.
Figure 9:
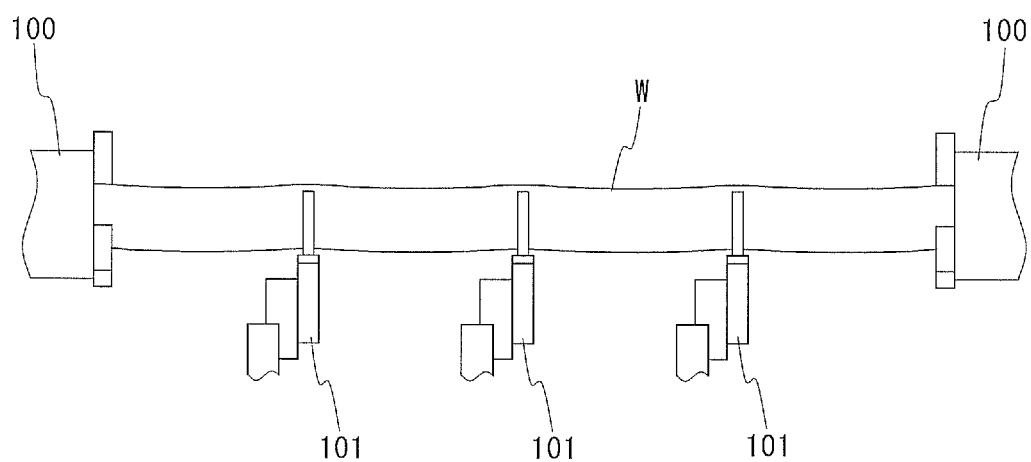
FIG. 9 is an illustration for illustrating a conventional problem.

Furthermore, in the above embodiment, it is configured so that the deflection shape of the workpiece W the middle portion of which is supported by the center rests 21 is calculated and the tool is moved along the calculated deflection shape. However, as shown in FIG. 7, it may be configured so that the deflection shape of the workpiece W which is supported only at both end portions thereof by the chucks 13, without the middle portion thereof being supported by the center rests 21 is calculated and the tool T is moved along the calculated deflection shape.

Additionally, although, in the above embodiment, the lathe 10 is provided as an example of the machining device, the machining device may be a grinding machine such as a cylindrical grinding machine. Further, the position data storage section 53 may be provided in the control device 25 instead of in the data processing device 50.

Reference Signs List

| 1 | Machining system |
|---|---|
| 10 | Lathe |
| 13 | First chuck |
| 15 | Second chuck |
| 20 | Tool rest |
| 21 | Center rest |
| 25 | Control device |

-continued

Reference Signs List

| 30 | Laser-type measuring device |
|---|---|
| 31 | Measuring head |
| 32 | Laser oscillator |
| 33 | CCD camera |
| 39 | Distance calculating section |
| 50 | Data processing device |
| 54 | Deflection shape calculating section |
| 55 | Offset amount calculating section |

CITATION LIST

Patent Literature

Japanese Unexamined Patent Application Publication No. 2002-59301
Japanese Unexamined Patent Application Publication No. 2004-261935

What is claimed is:

1. A machining method in which both end portions of an elongated workpiece are supported horizontally by end portion supporting means and the supported workpiece is rotated about its axis, and the outer peripheral surface of the workpiece is machined by relative movement of the workpiece and a tool held by tool holding means, the machining method characterized in that:

first, the workpiece is supported by the end portion supporting means and a measuring head for measuring the distance between the measuring head and the outer peripheral surface of the workpiece without contact is attached to the tool holding means;

subsequently, the workpiece is rotated about its axis at a rotational speed for when the workpiece is machined and the distance between the measuring head and the outer peripheral surface of the workpiece is measured by the measuring head at a plurality of positions in the direction of the workpiece axis and the deflection shape of the workpiece is calculated; and then the outer peripheral surface of the workpiece is machined by moving the tool along the calculated deflection shape.

2. A machining system comprising a machining device for machining the outer peripheral surface of an elongated workpiece supported horizontally and a non-contact measuring device for measuring the deflection of a workpiece to be machined by the machining device, the machining system characterized in that:

the machining device has end portion supporting means for supporting both end portions of the workpiece horizontally, rotation drive means for rotating the workpiece supported by the end portion supporting means about its axis, tool holding means which is provided so as to be movable in three orthogonal directions, a Z-axis parallel to the axis of the workpiece, an X-axis orthogonal to the Z-axis and parallel to the vertical direction, a Y-axis orthogonal to both of the Z-axis and the X-axis, and holds a tool, feed means for moving the tool holding means, and control means for controlling the rotation drive means and the feed means;

the non-contact measuring device has a measuring head which is configured so as to be attachable to and detachable from the tool holding means and which measures, at a plurality of measurement positions set in the Z-axis direction, without contact, the distance between the measuring head and the outer peripheral surface of the workpiece being supported by the end portion supporting means and being rotated by the rotation drive means at a rotational speed for when the workpiece is machined, and deflection shape calculating means for calculating the deflection shape of the workpiece on the basis of the distances measured by the measuring head at the measurement positions and the positions of the tool holding means when the distances were measured which are obtained from the control means; and the control means moves the tool along the deflection shape calculated by the deflection shape calculating means.

3. The machining system as set forth in claim 2, characterized in that the measuring head comprises light emitting means for emitting a laser beam toward the outer peripheral surface of the workpiece, light receiving means for receiving the laser beam reflected by the outer peripheral surface of the workpiece, and distance calculating means for calculating the distance between the measuring head and the outer peripheral surface of the workpiece on the basis of received-light data of the light receiving means.

4. The machining method as set forth in claim 1, wherein the workpiece is rotated about its axis at the rotational speed for when the workpiece is machined and the distances between the measuring head and a plurality of measurement points on the outer peripheral surface of the workpiece in a plane orthogonal to the direction of the workpiece axis are measured by the measuring head at a plurality of measurement positions in the direction of the workpiece axis, and the positions of the measurement points on the outer peripheral surface of the workpiece are calculated on the basis of the measured distances for each measurement position, the center position of the workpiece at each measurement position is calculated on the basis of the measured positions of the measurement points, and the deflection shape of the workpiece is calculated on the basis of the calculated center positions of the workpiece.

5. The machining method as set forth in claim 1, wherein the workpiece is rotated about its axis at the rotational speed for when the workpiece is machined and the distance between the measuring head and a measurement point on an upper outer peripheral surface of the workpiece is measured by the measuring head at a plurality of measurement positions in the direction of the workpiece axis, and the position of the measurement point on the upper outer peripheral surface of the workpiece is calculated on the basis of the measured distance for each measurement position, and the deflection shape of the workpiece is calculated on the basis of the calculated positions of the measurement points.

6. The machining system as set forth in claim 2, wherein the measuring head is configured to measure, at a plurality of measurement positions which are set in the Z-axis direction, the distances between the measuring head and a plurality of measurement points on the outer peripheral surface of the workpiece in a plane orthogonal to the direction of the workpiece axis, the workpiece being rotated by the rotation drive means at the rotational speed for when the workpiece is machined, and the deflection shape calculating means is configured to calculate, for each measurement position, the positions of the measurement points on the outer peripheral surface of the workpiece on the basis of the distances measured by the measuring head at the measurement position and the positions of the tool holding means when the distances were measured which are obtained from the control means, calculate the center position of the workpiece at each measurement position on the basis of the calculated positions of the measurement points, and calculate the deflection shape of the workpiece on the basis of the calculated center positions of the workpiece.

7. The machining system as set forth in claim 6, wherein the measuring head comprises light emitting means for emitting a laser beam in the Y-axis direction toward the outer peripheral surface of the workpiece, light receiving means for receiving the laser beam reflected by the outer peripheral surface of the workpiece, and distance calculating means for calculating the distance between the measuring head and an irradiation point of the laser beam on the outer peripheral surface of the workpiece that is the measurement point on the basis of received-light data of the light receiving means, and the distance is measured at a plurality of positions in the X-axis direction at each measurement position.

8. The machining system as set forth in claim 2, wherein the measuring head is configured to measure, at a plurality of measurement positions which are set in the Z-axis direction, the distance between the measuring head and a measurement point on an upper outer peripheral surface of the workpiece being rotated by the rotation drive means at the rotational speed for when the workpiece is machined, and the deflection shape calculating means is configured to calculate, for each measurement position, the position of the measurement point on the upper outer peripheral surface of the workpiece on the basis of the distance measured by the measuring head at the measurement position and the position of the tool holding means when the distance was measured which is obtained from the control means, and calculate the deflection shape of the workpiece on the basis of the calculated positions of the measurement points.

9. The machining system as set forth in claim 8, wherein the measuring head comprises light emitting means for emitting a laser beam in the X-axis direction toward the upper outer peripheral surface of the workpiece, light receiving means for receiving the laser beam reflected by the outer peripheral surface of the workpiece, and distance calculating means for calculating the distance between the measuring head and an irradiation point of the laser beam on the upper outer peripheral surface of the workpiece that is the measurement point on the basis of received-light data of the light receiving means.

* * * * *